(12) United States Patent
Uchida

(10) Patent No.: US 6,559,753 B1
(45) Date of Patent: May 6, 2003

(54) SELECTIVE RADIO CALL RECEIVER CAPABLE OF RECEIVING COMMON DATA IN EMERGENCY MODE

(75) Inventor: Jun Uchida, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/369,701

(22) Filed: Aug. 6, 1999

(30) Foreign Application Priority Data

Aug. 19, 1998 (JP) ............................................ 10-233221

(51) Int. Cl.[7] .......................... H04Q 7/00; H04M 11/04
(52) U.S. Cl. ..................... 340/7.59; 340/539; 455/12.1; 455/521; 379/45
(58) Field of Search ............................. 340/7.59, 7.52, 340/7.58, 7.46, 7.44, 636, 7.43, 7.5, 7.48, 7.55, 539, 502, 531; 455/521, 13.1, 12.1, 7.5, 67.7; 379/45, 46, 49, 51

(56) References Cited

U.S. PATENT DOCUMENTS

| | | | | |
|---|---|---|---|---|
| 5,189,400 A | * | 2/1993 | Schultz ........................ | 340/636 |
| 5,195,126 A | * | 3/1993 | Carrier et al. ................. | 379/45 |
| 5,224,150 A | * | 6/1993 | Neustein ..................... | 340/7.44 |
| 5,278,539 A | * | 1/1994 | Lauterbach et al. ......... | 340/539 |
| 5,430,440 A | * | 7/1995 | Shim .......................... | 340/7.52 |
| 5,628,050 A | * | 5/1997 | McGraw et al. ............ | 455/12.1 |

FOREIGN PATENT DOCUMENTS

| | | | |
|---|---|---|---|
| EP | 0197542 A2 | * 10/1986 | ............ G08B/3/10 |
| JP | 55-61315 | 5/1980 | |
| JP | 61-46634 | 3/1986 | |
| JP | 64-39132 | 2/1989 | |
| JP | 3-62745 | 3/1991 | |
| JP | 4-57938 | 5/1992 | |
| JP | 4-175019 | 6/1992 | |
| JP | 9-247720 | 9/1997 | |

\* cited by examiner

*Primary Examiner*—Brian Zimmerman
*Assistant Examiner*—William Bangachon
(74) *Attorney, Agent, or Firm*—Scully, Scott, Murphy & Presser

(57) ABSTRACT

In a method of notifying messages in a radio selective call receiver, a call which includes an identifier and a message is received. In a normal mode, arrival of the call is notified and the message of the call is displayed as a normal mode message, when the identifier of the call is same as that allocated to the receiver as a self identifier. An operation mode is automatically switched from the normal mode into an emergency mode when the identifier of the call is a common identifier and the message is a first predetermined message. In the emergency mode, arrival of the call is notified and the message of the call is displayed as an individual emergency message, when the identifier of the call is same as the self identifier. Also, in the emergency mode, arrival of the call is notified and the message of the call is displayed as a common emergency message, when the identifier of the call is same as the common identifier.

20 Claims, 8 Drawing Sheets

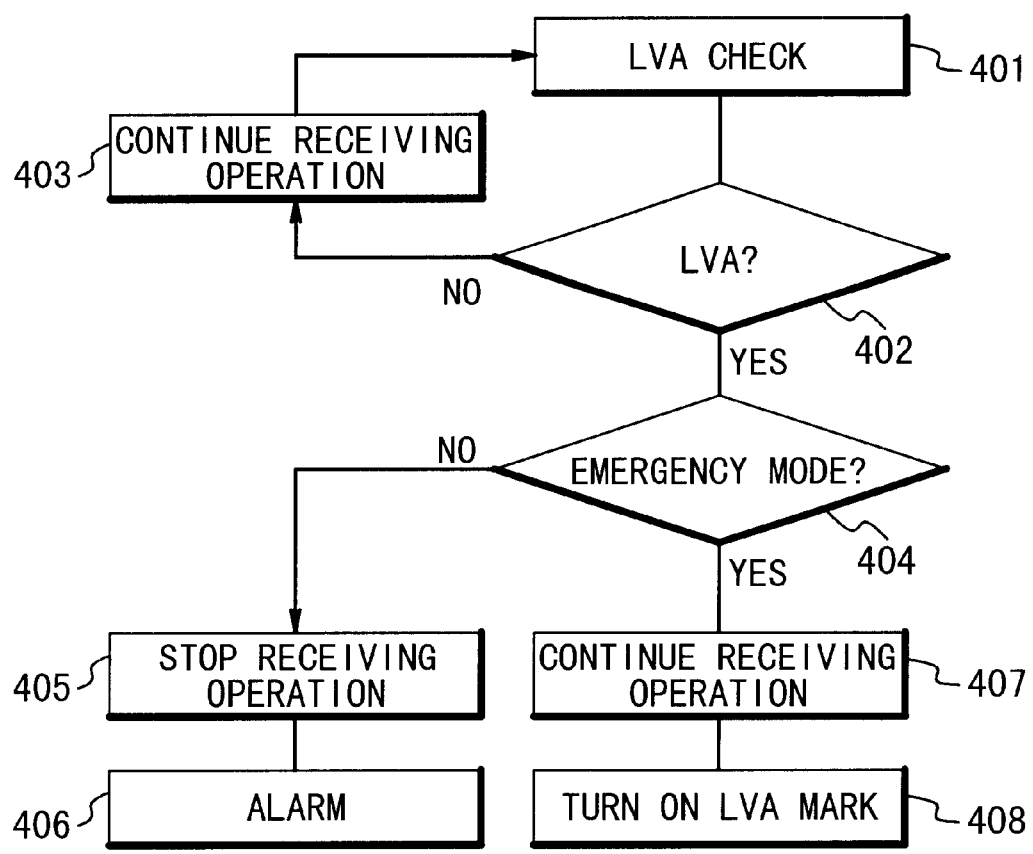

Fig. 5A

NORMAL MODE

<STATE 501>

10 GOOD MORNING
9 GOOD AFTERNOON
8 GOOD EVENING
7 YESTERDAY
[6] TODAY
[5] DAY BEFORE YESTERDAY
[4] CAR
[3] LUNCH
[2] MEAL
1 FAN

<STATE 502>

10 WAIT FOR CALL
9 GOOD MORNING
8 GOOD AFTERNOON
7 GOOD EVENING
6 YESTERDAY
[5] TODAY
[4] DAY BEFORE YESTERDAY
[3] CAR
[2] LUNCH
[1] MEAL

<STATE 503>

10 CALENDAR
9 WAIT FOR CALL
8 GOOD MORNING
7 GOOD AFTERNOON
6 GOOD EVENING
[5] TODAY
[4] DAY BEFORE YESTERDAY
[3] CAR
[2] LUNCH
[1] MEAL

Fig. 5B

TRANSFER TO EMERGENCY MODE

⟨STATE 504⟩

10  CALENDAR
9   WAIT FOR CALL
8   GOOD MORNING
7   GOOD AFTERNOON
6   GOOD EVENING
[5] TODAY
[4] DAY BEFORE YESTERDAY
[3] CAR
[2] LUNCH
[1] MEAL

⟨STATE 505⟩ •

*10 EARTHQUAKE LEVEL 5
9   CALENDAR
8   WAIT FOR CALL
7   GOOD MORNING
6   GOOD AFTERNOON
[5] TODAY
[4] DAY BEFORE YESTERDAY
[3] CAR
[2] LUNCH
[1] MEAL

⟨STATE 506⟩

*10 TSUNAMI
*9  DRIVER
*8  ROUTE 1
*7  MAGNITUDE
*6  FOCUS
*5  EARTHQUAKE LEVEL 5
[4] TODAY
[3] DAY BEFORE YESTERDAY
[2] CAR
[1] LUNCH

SELECTIVE RADIO CALL RECEIVER CAPABLE OF RECEIVING COMMON DATA IN EMERGENCY MODE

BACKGROUND OF THE INVENTION

1. Field of the Invention

The present invention relates to a radio selective call receiver, and more particularly, to a radio selective call receiver in which common data can be received in an emergency mode in addition to an individual data.

2. Description of the Related Art

Since the large earthquake in Kobe, the development of appliances such as an AM radio and a generator for disaster is remarkable. Therefore, it could be considered to use a pager as such an appliance having a wide cover area and long battery life and excellent in portability.

Generally, in the radio selective call receiver such as a pager, it is desirable that an individual data can be received in a normal mode. Also, it is desirable that the normal mode and an emergency mode in urgent disaster are automatically switched, and all the pagers can receive a common message in the emergency mode. Moreover, it is desirable to notify the reception of the common message in the emergency mode in a different sound from the normal mode. It is desirable that the sound level is set to a low level to save battery power, after confirming the common message in the emergency mode.

In conjunction with the above description, a paging receiver is described in Japanese Laid Open Patent application (JP-A-Showa 64-39132). In this reference, the receiver has a notifying unit of a sound source which is adjustable in sound volume or is possible in the ON/OFF control of sound generation for notice of call arrival. When a predetermined urgent call information is received, the call arrival is notified in the maximum sound volume irrespective of setting of the notifying unit.

Also, a selective call receiver is described in Japanese Laid Open Patent application (JP-A-Heisei 4-175019). In this reference, the receiver includes a pass word storage unit, a pass word detecting unit, a memory, a message storage control unit, a display unit and a message display control unit. The pass word detecting unit detects whether a pass word stored in the pass word detecting unit is present in a message. The message is stored in the memory by the message storage control unit to have a low priority when the pass word is not detected in the message by the pass word detecting unit and to have a high priority when the pass word is detected in the message by the pass word detecting unit. The message display control unit reads out the messages from the memory in order of higher priority in response to a message read operation to display on the display unit.

Also, a paging receiver is described in Japanese Laid Open Utility Model application (JP-U-Heisei 4-57938). In this reference, a special code is detected from a received message. When the special code is detected, a call sound continues to be generated for a longer time period than that when the special code is not detected, until a user performs an input operation to stop the call sound.

Also, a paging system is described in Japanese Laid Open Patent application (JP-A-Heisei 9-247720). In this reference, a radio selective call unit outputs an individual call signal and a broadcast call signal. Individual selective call receivers are called based on the individual call signals, respectively. The receivers are collectively called based on the broadcast call signal. The radio selective call unit outputs the individual call signal when an individual call instruction signal is received from a public telephone line. Also, the radio selective call unit outputs the broadcast call signal when a broadcast call instruction signal is received from the public telephone line or a console connected thereto.

SUMMARY OF THE INVENTION

Therefore, an object of the present invention is to provide a method of notifying an emergency message and a radio selective call receiver for the same, in which a normal mode and an emergency mode are automatically and compulsorily switched, so that the emergency message can be reliably transmitted.

Another object of the present invention is to provide a method of notifying an emergency message and a radio selective call receiver for the same, in which an urgent disaster data is primarily notified.

In order to achieve an aspect of the present invention, a method of notifying messages in a radio selective call receiver, a call which includes an identifier and a message is received. In a normal mode, arrival of the call is notified and the message of the call is displayed as a normal mode message, when the identifier of the call is same as that allocated to the receiver as a self identifier. An operation mode is automatically switched from the normal mode into an emergency mode when the identifier of the call is a common identifier and the message is a first predetermined message. In the emergency mode, arrival of the call is notified and the message of the call is displayed as an individual emergency message, when the identifier of the call is same as the self identifier. Also, in the emergency mode, arrival of the call is notified and the message of the call is displayed as a common emergency message, when the identifier of the call is same as the common identifier.

The method according may further include automatically switching the operation mode from the emergency mode into the normal mode when the identifier of the call is the common identifier and the message is a second predetermined message.

Also, a battery voltage may be detected. The receiving operation is stopped in the normal mode when the detected battery voltage is lower than a predetermined voltage, and continued in the emergency mode even if the detected battery voltage is lower than the predetermined voltage. In this case, a symbol may be displayed to indicate that the detected battery voltage is lower than the predetermined voltage.

Also, in the notifying arrival of the call and the displaying the normal mode message in the normal mode, it is determined in the normal mode whether the normal mode message contains an error. In the normal mode, the arrival of the call is notified and the normal mode message is displayed, when it is determined that the normal mode message does not contain any error. Also, in the normal mode, the arrival of the call is notified and the normal mode message is displayed, when it is determined that the normal mode message contains any error, and when an error message display permission is set in the normal mode message. Moreover, in the normal mode, notification of the arrival of the call and display of the normal mode message may be stopped, when it is determined that the normal mode message contains any error, and when an error message display permission is not set in the normal mode message. In this case, in the emergency mode, arrival of the call is notified and the individual emergency message is displayed, when the identifier of the call is same as the self identifier, regardless of whether the individual emergency message contains the error. Also, in the emergency mode, arrival of the call is notified and the common emergency message is displayed, when the identifier of the call is same as the common identifier, regardless of whether the common emergency message contains the error.

In addition, a protection indicator may be set to each of ones of the received normal mode messages. The normal mode messages with the protection indicator are held in a higher priority than the normal mode messages with no protection indicator, and the individual or common emergency messages are held in a higher priority than the normal mode messages with the protection indicator. In this case, the newest message may be held in a higher priority than the oldest message in each of the individual or common emergency messages, the normal mode messages with the protection indicator, and the normal mode messages with no protection indicator.

In addition, it may be determined whether a confirmation switch is operated after the emergency mode is set. The notifying of arrival of the call is carried out in the emergency mode for a first predetermined time period, and for a second predetermined time period which is shorter than the first predetermined time period, when it is determined that the confirmation switch is operated after the emergency mode is set.

In addition, the automatically switching of the operation mode from the normal mode into the emergency mode is notified in a sound volume larger than that set for the notifying the arrival of the call.

In order to achieve another aspect of the present invention, a radio selective call receiver, includes a notifying section, a display unit, a receiving unit receiving a call which includes an identifier and a message, and a processor. The processor drives the notifying section to notify arrival of the call, and drives the display unit to display the message as a normal mode message in a normal mode, when the identifier of the call is same as that allocated to the receiver as a self identifier, as an individual emergency message in an emergency mode, when the identifier of the call is same as the self identifier, and as a common emergency message in the emergency mode, when the identifier of the call is a common identifier. Also, the processor drives the notifying section to notify arrival of the normal mode message in the normal mode, and arrival of the individual emergency message and the common emergency message in the emergency mode, and automatically switches the operation mode from the normal mode into the emergency mode when the identifier of the call is the common identifier and the message is a first predetermined message.

The processor may automatically switches the operation mode from the emergency mode into the normal mode when the identifier of the call is the common identifier and the message is a second predetermined message, and drives the display section and the notifying section to the switching of the operation mode.

When the radio selective call receiver may further include a detector detecting a battery voltage. At this time, the processor controls the receiving unit to stop the receiving operation of in the normal mode when the detected battery voltage is lower than a predetermined voltage, and to continue the receiving operation in the emergency mode even if the detected battery voltage is lower than the predetermined voltage. In this case, the processor controls the display unit to display a symbol indicating that the detected battery voltage is lower than the predetermined voltage.

The processor may determine in the normal mode whether the normal mode message contains an error. At this time, the processor controls the display unit and the notifying section in the normal mode, to notify the arrival of the call and to display the normal mode message, when it is determined that the normal mode message does not contain any error, in the normal mode, to notify the arrival of the call and to display the normal mode message, when it is determined that the normal mode message contains any error, and when an error message display permission is set in the normal mode message, and in the normal mode, to stop notification of the arrival of the call and to display of the normal mode message, when it is determined that the normal mode message contains any error, and when an error message display permission is not set in the normal mode message. In this case, the processor may control the display unit and the notifying section in the emergency mode, to notify arrival of the call and to display the individual emergency message, when the identifier of the call is same as the self identifier, regardless of whether the individual emergency message contains the error, and when the identifier of the call is same as the common identifier, regardless of whether the common emergency message contains the error.

In addition, the processor may selectively set a protection indicator to each of the received normal mode messages in accordance with an instruction by a user. At this time, the processor holds the normal mode messages with the protection indicator in a higher priority than the normal mode messages with no protection indicator, and holds the individual or common emergency messages in a higher priority than the normal mode messages with the protection indicator. In this case, the processor may hold the newest message in a higher priority than the oldest message in each of the individual or common emergency messages, the normal mode messages with the protection indicator, and the normal mode messages with no protection indicator.

In addition, the processor may determine whether a confirmation switch is operated after the emergency mode is set. At this time, the processor controls the notifying section to notify arrival of the call in the emergency mode for a first predetermined time period, and to notify arrival of the call in the emergency mode for a second predetermined time period which is shorter than the first predetermined time period, when it is determined that the confirmation switch is operated after the emergency mode is set.

In addition, the processor controls the notifying section to notify the switching of the operation mode into the emergency mode in a sound volume larger than that set to notify the arrival of the call in the normal mode.

BRIEF DESCRIPTION OF THE DRAWINGS

FIG. 4 is a flow chart illustrating an operation of the radio selective call receiver according to a third embodiment of the present invention;

FIGS. 5A and 5B are diagrams showing messages stored in a memory in a normal mode and an emergency mode in the radio selective call receiver according to a fourth embodiment of the present invention.

DESCRIPTION OF THE PREFERRED EMBODIMENTS

Hereinafter, a radio selective call receiver of the present invention will be described below in detail with reference to the attached drawings.

Figure 1:
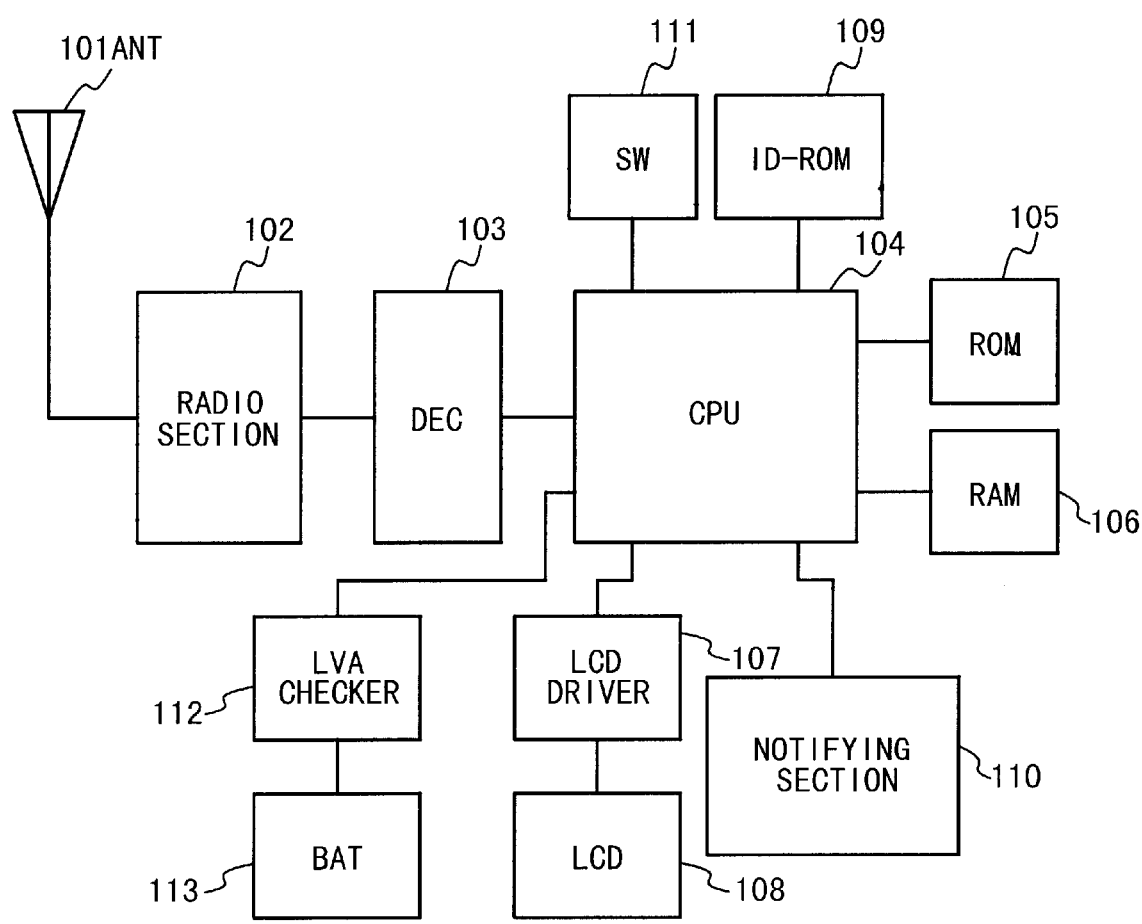
FIG. 1 is a circuit block diagram illustrating the structure of a radio selective call receiver according to a first embodiment of the present invention.

FIG. 1 is a circuit block diagram illustrating the structure of the selective call radio receiver such as a pager according to the first embodiment of the present invention. The radio selective call receiver in the first embodiment is composed of an antenna (ANT) 101, a radio section 102, a decoder (DEC) 103, a CPU 104, a ROM 105, a RAM 106, a LCD driver 107, an LCD 108, an ID-ROM 109, a switch (SW) section 111, a low battery voltage (LVA) checker 112 and a battery (BAT) 113.

The radio section 102 amplifies and demodulates a radio signal received by an antenna 101. The ID-ROM 109 stores an individual identifier individually allocated to the receiver as a self ID and a common identifier as a common ID. The individual ID is used to specify the radio selective call receiver. The common ID is used such that all of radio selective call receivers can receive the same data in case of emergency.

The decoder (DEC) 103 decodes the demodulated signal. A program is written in a ROM 105. A CPU 104 executes the program to control the functions of the whole radio selective call receiver. The CPU 104 reads out the self ID and the common ID and compares a call number of the decoded signal and the self ID or the common ID. When the call number of the decoded signal and the self ID or the common ID are coincident with each other, the CPU 104 stores a message of the decoded signal in the RAM 106.

When the message is received, the CPU 104 controls the LCD driver 107 to drive an LCD 108 in accordance with an instruction from the CPU 104. Also, the CPU 104 controls the notifying section 110 in accordance with an instruction from the CPU 104. The notifying section 110 is composed of a speaker and/or a vibrator. A switch section 111 is attached to the CPU 104.

The LVA checker 112 checks the voltage of the battery 113 and informs the checking result to the CPU 104.

Figure 2:
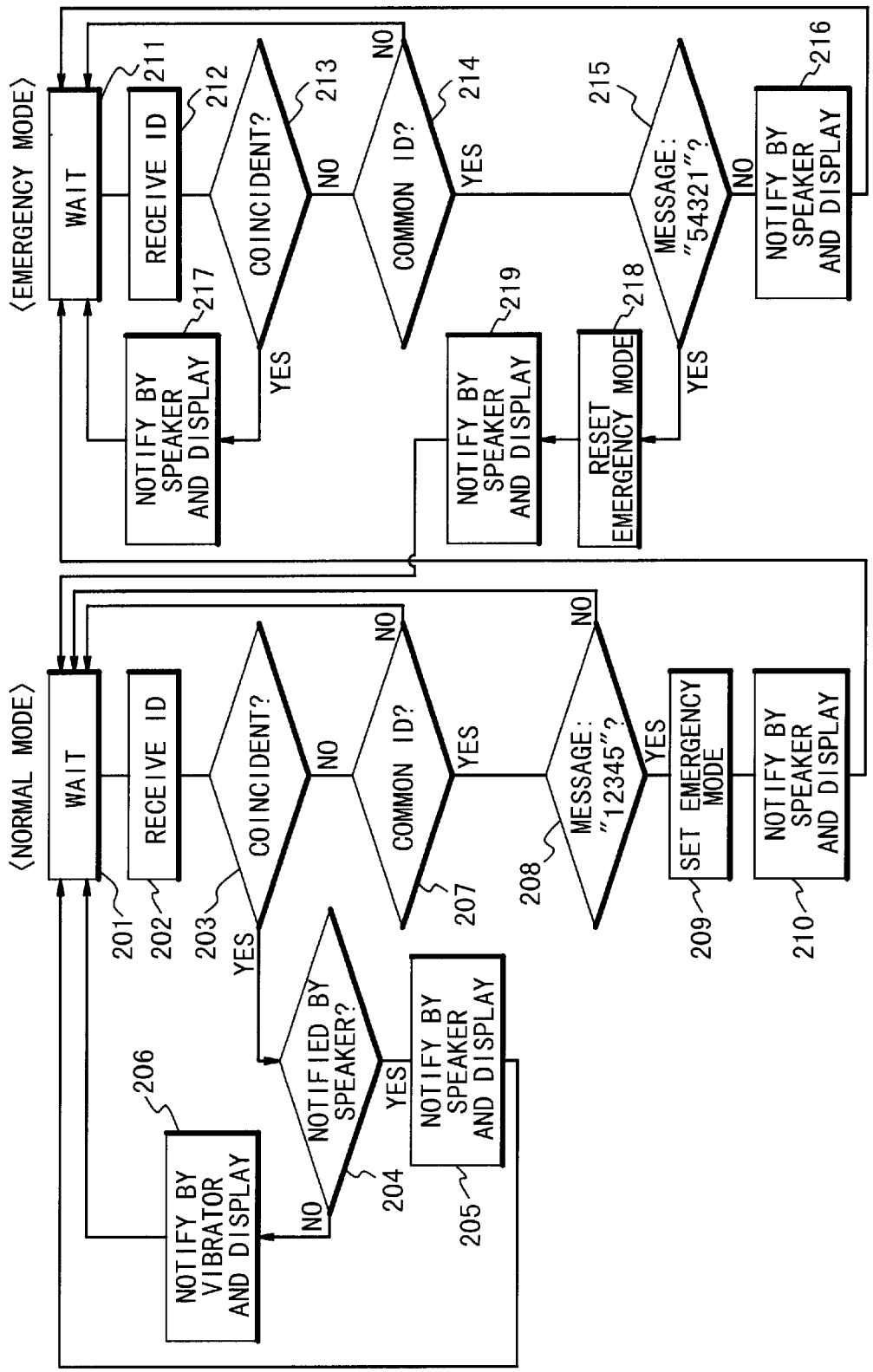
FIG. 2 is a flow chart illustrating an operation of the radio selective call receiver according to the first embodiment of the present invention.

FIG. 2 is a flow chart showing an operation of the radio selective call receiver according to the first embodiment of the present invention. The radio selective call receiver waits for any radio signal at a step 201. The receiver always receives radio wave by the antenna 101 to awaits its ID in the normal mode. When an ID is received in the radio signal in a step S202, the CPU 104 determines in a step S203 whether or not the received ID is coincident with the ID which is allocated to the receiver, i.e., the self ID. When the received ID is coincident with the self ID, the notifying section 110 is started to operate by the CPU 104.

The CPU 104 determines at a step S204 whether the currently set notifying unit of the notifying section 110 is the speaker or the vibrator. When the speaker is set, the reception of the ID is notified by the speaker at a step S205, and when the vibrator is set, the reception of the ID is notified by the vibrator at a step S206. The display of a received message is carried out by the LCD driver 107 and the LCD 108 under the control of the CPU 104 at the same time of the notifying operation. The setting of the speaker or vibrator can be determined in accordance with an instruction by a user, and the setting result is stored in the ID-ROM 109.

Such an operation flow is the flow of the usual reception operation and the usual notifying operation in the radio selective call receiver. The operation flow is carried out in a normal mode. When the notifying operation and the message displaying operation is completed, the control returns to the wait state at the step S201 once again.

When the received ID is not coincident with the self ID at the step S203, it is determined at a step S207 whether or not the received ID is coincident with the common ID. The common ID is common to all the radio selective call receivers for notice of an emergency state such as a disaster. When the received ID is different from the common ID, the control returns to the wait state at the step S201. When the received ID is coincident with the common ID, the CPU 104 confirms the received message at a step S208. At this time, if the message is a specific message 1, e.g., "12345", the operation mode is automatically switched to an emergency mode at a step S209. Then, the notice by the speaker and the display of the message is carried out at a step S210.

The notice at the step S210 is carried out by the speaker at the maximum volume and by the display to inform that the emergency mode is set, irrespective of whether or not the currently set notifying unit is the speacker. Thus, the notice is carried out by the speaker at the maximum volume to notify the emergency mode to the user immediately, because the message is the data which needs urgency in case of the disaster. As the notice at the un-urgent time, one or more of a single sound speaker notice, the step-by-step tone speaker notice, the vibrator vibration notice, the silent movie notice (blinking display) are selected. Only a speaker notice and a vibrator notice are shown in the flow chart for an explanation to be simplified.

When the message is not "12345", the control returns to the wait state at the step 201 but it is rare that the message is other than "12345" when the common ID is transmitted. This is because the ID for the emergency message is never transmitted in vain, and when the common ID for the emergency message is transmitted, the message "12345" is attached for notice of an emergency condition. This is a promise between the base station and the terminal. Therefore, the switching from the step S208 to the wait state at the step S201 is possible to occur when the reception cannot be carried out because of an accident during the message reception. In order to prevent such an accident, the common ID and message are repeatedly transmitted twice or more such that all the radio selective call receivers can receive the message.

When having been set to the emergency mode, the radio selective call receiver enters an emergency mode wait state at a step S211 and waits for the following ID reception as in the normal mode. When the following ID is received in the radio signal at a step S212, the CPU 104 determines whether or not the received ID is coincident with the self ID at a step S213. When the common ID is transmitted, emergency data such as disaster data is transmitted one after another from the base station. Therefore, it could be considered that much more data than in the normal mode are sent.

It is determined at a step S214 whether or not the received ID is coincident with the common ID, if not being coincident with the self ID. The control returns to the wait state at the step S211 if the received ID is not coincident with the common ID. When it is determined at the step S215 that the received ID is coincident with the common ID, the message is confirmed. If the message is other than the specific message 2, e.g., "54321", the reception of the emergency message is notified by the speaker at the maximum volume without relation with that the notifying unit set by the user, as described above. Also, the message is displayed at a step S216. Then, the message is stored in the RAM 106.

When the received ID at the step S212 is coincident with the self ID, the reception of the message is notified at a step S217 by the speaker at the maximum volume without relation with that the notifying unit set by the user, because there is a high possibility that the received message is an urgent message from the acquaintance. Thus, the message is notified to the user. Then, the message is stored in the RAM 106.

The message is confirmed at the step S215. If the message is "54321", the message instructs cancellation of the emergency mode. This is notified to the user by the speaker at a step S219. Then, the control returns to the wait state in the normal mode at the step S201. When the operation mode returns to the normal mode, the notifying method is resets to the way specified by the user.

Figure 3:
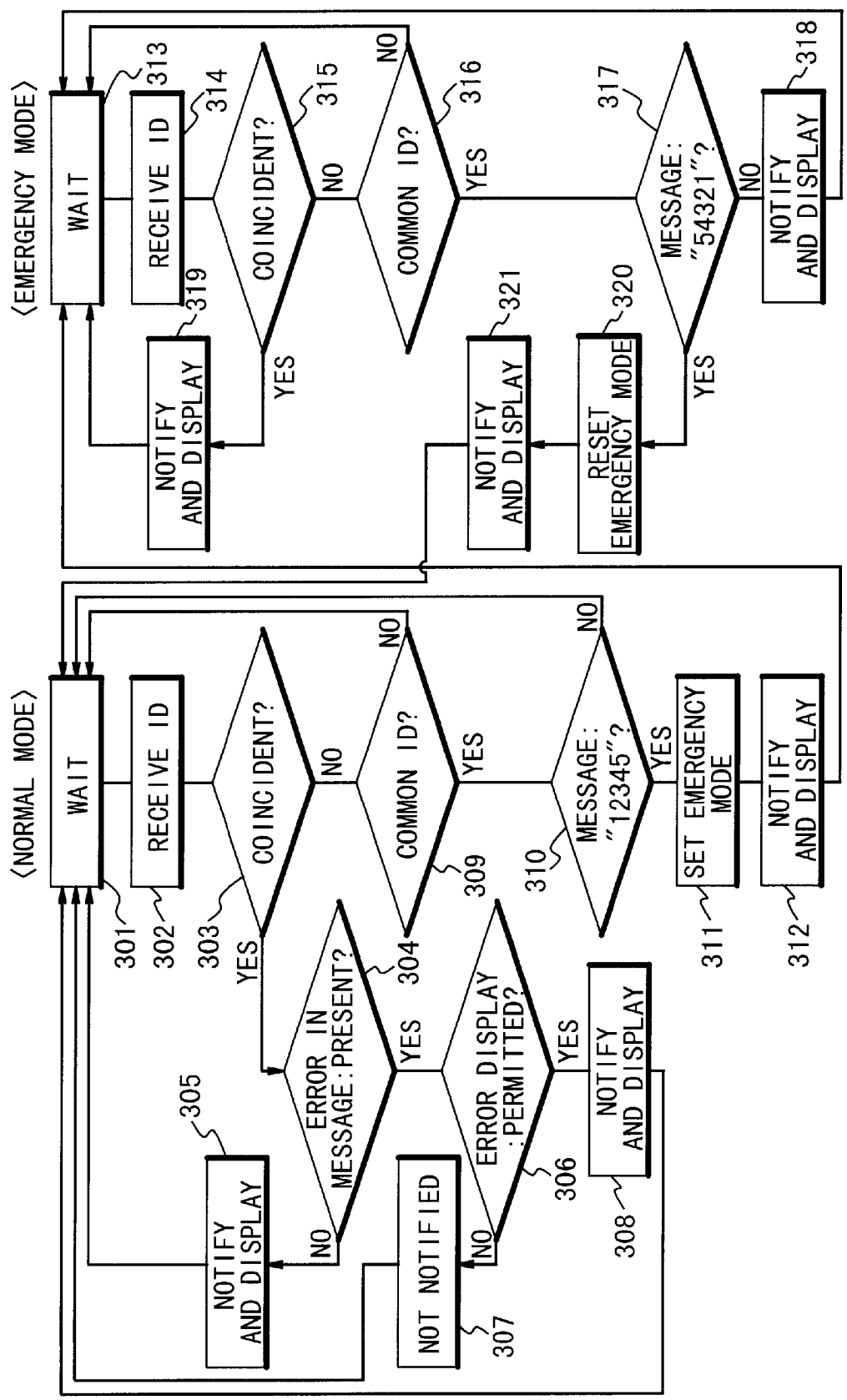
FIG. 3 is a flow chart illustrating an operation of the radio selective call receiver according to a second embodiment of the present invention.

FIG. 3 is a flow chart showing a message error display which is attached to the function of the radio selective call receiver according to the second embodiment of the present invention. The radio selective call receiver according to the second embodiment of the present invention has the same structure as that of the first embodiment.

The message error is an error of the received message produced due to any cause. In a pager as the radio selective call receiver, BCH code is attached to the message for error detection and correction of the message, even if the message contains a little error. The BCH code is formed of a plurality of random digital signals in accordance with a rule. Other code may be used.

In the radio selective call receiver, a reception message signal and the received BCH code are compared with each other to determine whether or not the received message is correct. If the BCH code is normally received and the reception message contains an error within 2 bits, the reception message can be corrected. In case of the error equal to or more than 3 bits, the message can not be corrected so that the message is handled as an error message.

An error display permission is a function to determine whether or not such an error message is to be displayed. Generally, in the radio selective call receiver, the user can set such a function. In an error display non-permission, the error message is not displayed.

When the next ID is received at a step S302 during the wait state at a step S301, it is determined at a step S303 whether or not the received ID is coincident with the self ID. When the received ID is coincident with the self ID, the received message is compared with the BCH code at a step S304 to determine whether the received message contains any error. When the received message does not contain any error, the reception of the message is notified and the message is displayed at a step S305. Then, the control returns to the wait state at the step S301.

When it is determined that the received message contains any error, the error display permission or non-permission which is set by the user set is confirmed by the CPU 104 at a step S306. If the error display non-permission is set, the reception of the error message is not notified and the message is not displayed at a step S307. If the error display permission is set, the reception of the error message is notified and the error message is displayed at a step S308, although there is the error in the message, as in the first embodiment. Then, the control returns to the wait state at the step S301.

The control returns to the wait state at the step S301, if the received ID is not coincident with either of the self ID. The message is confirmed at a step S310, if the received ID is the common ID. The control returns to the wait state at the step 301 if the message is not "12345". If the message is "12345", the operation mode enters the emergency mode at a step S311. In the emergency mode, it is notified to the user at a step S312. Then, the control advances to the wait state in the emergency mode at a step S313.

In the wait state in the emergency mode at the step S313, the radio selective call receiver receives an ID at a step S314. It is determined at a step S315 whether or not the received ID is coincident with the self ID. It is determined at a step S316 whether or not the received ID is the common ID if the received ID is not coincident with the self ID. If the received ID is not coincident with the common ID and the self ID, the control returns to the wait state at the step S313.

If the received ID is the common ID, the message is confirmed at a step S317. If the message is other than "54321", the reception of the message is notified and the message is displayed at a step S318. Then, the message is stored in the RAM 106.

In this case, the confirmation of the error display permission or non-permission which has been carried out in the normal mode is not carried out in the emergency mode. The reception of the important emergency or disaster message is notified and the message is displayed irrespective of the setting state of the error display permission or non-permission.

Also, the received ID is coincident with the self ID, the message is notified and displayed at a step S319 irrespective of the setting state of the error display permission or non-permission, because the message is an important data from a friend. Then, the message is stored in the RAM 106.

If the message is "54321" at a step S320, it means the cancellation of the emergency mode. It is notified to the user at a step S321 and the control returns to the wait state in the normal mode at the step S301. In the normal mode, the message display is controlled in accordance with the error message permission or non-permission which is set by the user.

FIG. 4 is a flow chart showing a low voltage alert (LVA) function which is attached to a radio selective call receiver according to the third embodiment of the present invention. The radio selective call receiver according to the third embodiment of the present invention has the same structure as that of the first embodiment.

The low voltage alert function is the function to inform the user that the battery voltage has become low. Generally, the low voltage alert voltage is about 1.1 V and when the battery voltage becomes lower than 1.1 V, the radio characteristic starts to be degraded.

In a step S401 of FIG. 4, the battery voltage is checked by the LVA checker 112. The low voltage alert check is carried out in the frequency of once per about one minutes. The battery voltage is monitored at a step S402 to determine whether or not the battery voltage is lower than the low voltage alert voltage. If the battery voltage is not lower than the low voltage alert voltage, the receiving operation is continued at a step S403. If the battery voltage is lower than the low voltage alert voltage, it is determined at a step S404 whether or not the operation mode is the emergency mode at present.

The receiving operation is stopped at a step S405 if the operation mode is not the emergency mode. Also, an alarm sounds for a caution to replace the battery for a new one at a step S406. On the other hand, if the operation mode is the emergency mode, even if the battery voltage is lower than the low voltage alert voltage, the receiving operation is continued at a step S407 such that it is possible to get a lot of valuable emergency or disaster data. The radio characteristic starts to be degraded and the possibility to receive a message becomes low in the area where the radio wave is weak. However, the message continues to be received as far as the battery life continues.

Lastly, the battery power is consumed and the radio selective call receiver cannot operate. Also, because exchange of the battery must be prompted to a user even if the receiving operation is continued, a mark or symbol is displayed at a step S408 to indicate the low voltage alert state and to warn the user of it.

FIGS. 5A and 5B is flow charts of the message storage priority which is related to the radio selective call receiver according to the fourth embodiment of the present invention. The radio selective call receiver according to the fourth embodiment of the present invention has the same structure as that of the first embodiment.

There is a limit in the message storage capacity of the radio selective call receiver, and about 100 messages can be stored in the radio selective call receiver. Also, the important ones of the stored messages can be protected. The protected message is primarily stored in the memory. If all the messages in the memory are protected, a newly received message cannot be received. Therefore, about 20 messages of 100 messages can be generally protected.

For simplification of the description, it is supposed that the radio selective call receiver can store 10 messages and 5 messages can be protected. At a state 501, 10 messages which have been received in the past stored in the memory (RAM) 106. 5 messages from a message 2 to a message 6 are protected among the 10 messages, and indicated by [ ].

When a message of "wait for call" is received in the state 501, the memory contents are rearranged to a state 502 and a non-protected oldest message 1 of "fan" is erased because of a storage capacity overflow. Moreover, when the message of "calendar" is received in the state 502, the memory contents are rearranged to a state 503 and the non-protected and oldest message 6 of "yesterday" is erased without the protected messages 1 to 5 being erased. This is because the message 6 is the oldest one of the non-protected messages in the state 502. In this way, the message storage priority is higher in order of a protection message, a new non-protected message and an old and non-protected message.

At this time, when the operation mode is switched from the normal mode to the emergency mode, the message state 503 is left as a state 504 just as it is. Then, when an emergency message of "earthquake level 5" is received in the state 504, the non-protected and oldest message 6 of "good evening" is erased because of the storage capacity overflow. Then, the memory contents are rearranged to a state 505. In the state 505, the emergency message is shown with the symbol "*".

Moreover, when 5 emergency messages are received in the state 505, the non-protected messages 6 to 9 and the protected and oldest message 1 are erased because of the storage capacity overflow. Then, the memory contents are rearranged to a state 506.

In this way, the message priority in the emergency mode is higher in order of the emergency message, the protected message in the normal mode and the non-protected message in the normal mode.

The received message with the self ID in the emergency mode has the same message priority as the emergency message.

Figure 6A:
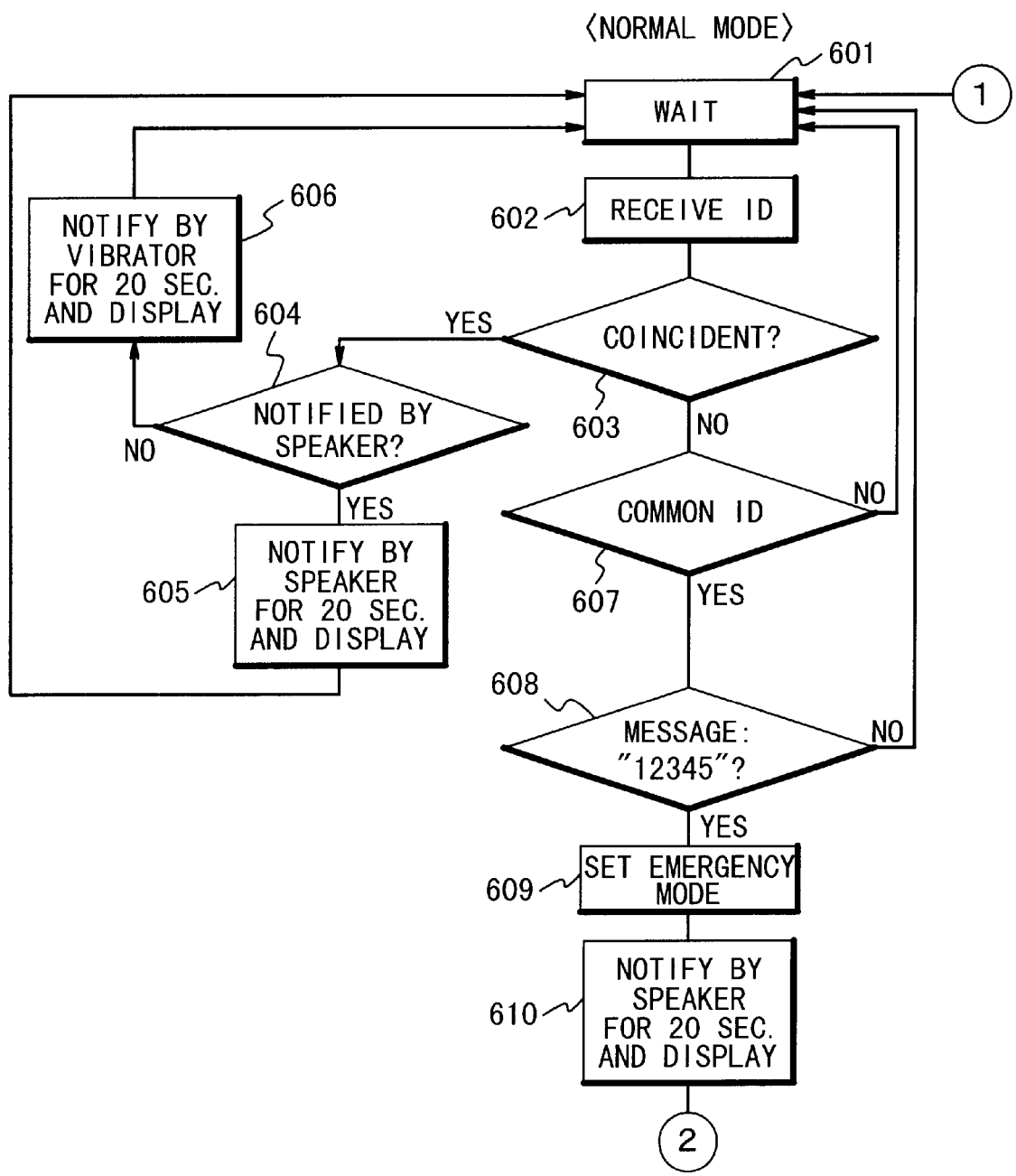
FIGS. 6A and 6B are flow charts illustrating an operation of the radio selective call receiver according to a fifth embodiment of the present invention.
Figure 6B:
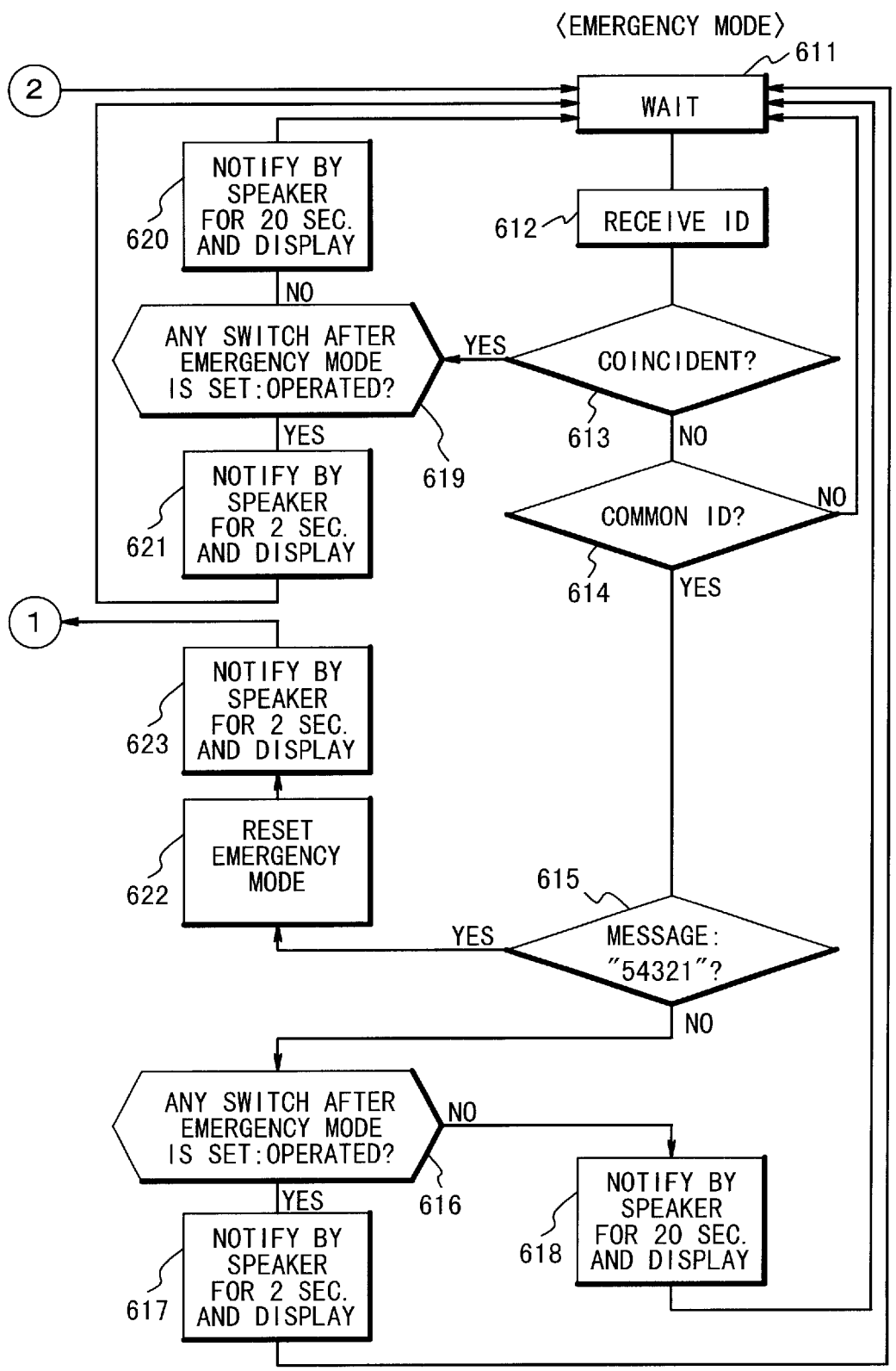

FIGS. 6A and 6B show the operation of the radio selective call receiver according to the fifth embodiment of the present invention. The radio selective call receiver according to the fifth embodiment of the present invention has the same structure as that of the first embodiment.

At a step 601, the receiver is in the wait state. When some ID is received at a step 602, it is first determined at a step 603 whether or not the received ID is coincident with the self ID. When it is determined that the received ID is coincident with the self ID, it is determined at a step 604 whether or not the notice setting is the vibrator or the speaker. If the speaker is set, the notice is carried out by the speaker for 20 seconds at a step 605. If the vibrator is set, the notice is carried out by the vibrator for 20 seconds at a step 606. Then, the control returns to the wait state at the step 601.

Generally, the notice time of the radio selective call receiver is automatically reset after 20 seconds. The notifying operation is stopped if a switch (SW) section 111 is operated during the notifying operation (this is called a manual reset).

On the other hand, when it is determined that the received ID is not coincident with the self ID, it is determined at a step 607 whether or not the received ID is coincident with the common ID. When the received ID is different from the common ID, the control returns to the wait state. When the received ID is coincident with the common ID, the message is confirmed at a step 608. The operation mode enters the emergency mode at a step 609 if the message is "12345". Then, it is notified by the speaker for 20 seconds at a step 610. When the message is not "12345", the control returns to the wait state.

The radio selective call receiver in the emergency mode advances to the wait state at a step 611 and waits for the ID reception, as in the normal mode. When some ID is received at a step 612, it is determined at a step 613 whether or not the received ID is coincident with the self ID. When it is determined at a step 614 that the received ID is not coincident with the self ID, it is determined whether or not which the received ID is coincident with the common ID. When the received ID is coincident with the common ID, a message is confirmed at a step 615. The control returns to the wait state at the step 611 if the received ID is not coincident with the common ID.

If the message is other than "54321", it is determined at a step 616 whether or not the switch SW section 111 is operated in the emergency mode. If the switch SW section 111 is operated, the notifying operation by speaker is carried out for 2 seconds at a step 617. If the switch section 111 is not operated, the notifying operation by speaker is carried out for 20 seconds at a step 618.

The operation of the switch SW section 111 in the emergency mode means that the notifying operation is stopped by the user or the message display is confirmed. Therefore, it could say that the user recognizes that the operation mode is the emergency mode. If the user recognizes the emergency mode, the user would always try to obtain emergency data. In this case, the user could recognize the reception of the emergency data through the notifying operation by the speaker for a short time, i.e., 2 seconds. On the other hand, if the switch section 111 is not operated in the emergency mode, the user does not recognize an emergency condition such as disaster yet. Or, the receiver is not carried by the user and located on a place near to the user. In such a case, the notifying operation is carried out for a long time, i.e., 20 seconds to notice the user.

Because the notifying operation by the speaker requires the largest power consumption to the battery, such a function becomes necessary to obtain as many messages as possible. At this time, the control still ignores the notice setting by the user. Also, when the ID received at the step 611 is coincident with the self ID, the same steps 619, 620 and 621 as those when the common ID is received are carried out as shown in FIG. 6B, because the received message has the possibility to be an urgent message from a friend. Thus, the received message is stored in the RAM 106 as an individual or common emergency message.

At a step 615, the message is confirmed. At this time, if the message is "54321", it indicates cancellation of the emergency mode at a step 622. It is notified to the user by the speaker for 20 seconds at a step 623. Then, the control returns to the wait state in the normal mode. When the operation mode is switched to the normal mode, the notice way is reset to the way set by the user.

Recently, an information channel service is started to provide a general data. All the radio selective call receivers can receive the information channel service data. In case of an emergency condition such as disaster, the emergency data can be provided using this information channel service. In this case, the radio selective call receiver may be set to the emergency mode by use of an information channel ID and a special message.

As described above, according to the radio selective call receiver of the present invention, the radio selective call receiver can be switched into the emergency mode in case of the emergency condition such as disaster. Therefore, a lot of emergency data can be provided for the users as much as possible.

What is claimed is:

1. A method of notifying messages in a radio selective call receiver, comprising:
   receiving a call which includes an identifier and a message;
   in a normal mode, notifying arrival of said call and displaying said message of said call as a normal mode message, when said identifier of said call is same as that allocated to said receiver as a self identifier;
   automatically switching an operation mode from said normal mode into an emergency mode when said identifier of said call is a common identifier and said message is a first predetermined message;
   in said emergency mode, notifying arrival of said call and displaying said message of said call as an individual emergency message, when said identifier of said call is same as said self identifier; and
   in said emergency mode, notifying arrival of said call and displaying said message of said call as a common emergency message, when said identifier of said call is same as said common identifier.

2. A method according to claim 1, further comprising:
   automatically switching the operation mode from said emergency mode into said normal mode when said identifier of said call is said common identifier and said message is a second predetermined message.

3. A method according to claim 1, further comprising:
   detecting a battery voltage;
   stopping the receiving operation in said normal mode when the detected battery voltage is lower than a predetermined voltage; and
   continuing the receiving operation in said emergency mode even if the detected battery voltage is lower than the predetermined voltage.

4. A method according to claim 3, wherein said continuing includes displaying a symbol indicating that the detected battery voltage is lower than the predetermined voltage.

5. A method according to claim 1, wherein said notifying arrival of said call and displaying said normal mode message in said normal mode includes:
   determining in said normal mode whether said normal mode message contains an error;
   in said normal mode, notifying the arrival of said call and displaying said normal mode message, when it is determined that said normal mode message does not contain any error;
   in said normal mode, notifying the arrival of said call and displaying said normal mode message, when it is determined that said normal mode message contains any error, and when an error message display permission is set in said normal mode message; and
   in said normal mode, stopping notification of the arrival of said call and display of said normal mode message, when it is determined that said normal mode message contains any error, and when an error message display permission is not set in said normal mode message.

6. A method according to claim 5, wherein said notifying the arrival of said call and said displaying said individual emergency message in said emergency mode includes:
   in said emergency mode, notifying arrival of said call and displaying said individual emergency message, when said identifier of said call is same as said self identifier, regardless of whether said individual emergency message contains the error, and
   wherein said notifying the arrival of said call and said displaying said common emergency message in said emergency mode includes:
   in said emergency mode, notifying arrival of said call and displaying said common emergency message, when said identifier of said call is same as said common identifier, regardless of whether said common emergency message contains the error.

7. A method according to claim 1, further comprising:
   setting a protection indicator to each of ones of the received normal mode messages;
   holding the normal mode messages with said protection indicator in a higher priority than the normal mode messages with no protection indicator; and
   holding the individual or common emergency messages in a higher priority than the normal mode messages with said protection indicator.

8. A method according to claim 7, further comprising:
   holding the newest message in a higher priority than the oldest message in each of the individual or common emergency messages, the normal mode messages with said protection indicator, and the normal mode messages with no protection indicator.

9. A method according to claim 1, wherein said notifying arrival of said call in said emergency mode includes:
   said notifying arrival of said call in said emergency mode for a first predetermined time period;
   determining whether a confirmation switch is operated after said emergency mode is set;
   said notifying arrival of said call in said emergency mode for a second predetermined time period which is shorter than said first predetermined time period, when it is determined that said confirmation switch is operated after said emergency mode is set.

10. A method according to claim 1, wherein said automatically switching the operation mode from said normal mode into said emergency mode includes:
    notifying said switching in a sound volume larger than that set for said notifying the arrival of said call.

11. A radio selective call receiver, comprising:

a notifying section;

a display unit;

a receiving unit receiving a call which includes an identifier and a message; and a processor which:

drives said notifying section to notify arrival of said call, drives said display unit to display said message as a normal mode message in a normal mode, when said identifier of said call is same as that allocated to said receiver as a self identifier, as an individual emergency message in an emergency mode, when said identifier of said call is same as said self identifier, and as a common emergency message in said emergency mode, when said identifier of said call is a common identifier, drives said notifying section to notify arrival of said normal mode message in said normal mode, and arrival of said individual emergency message and said common emergency message in said emergency mode, and automatically switches said operation mode from said normal mode into said emergency mode when said identifier of said call is said common identifier and said message is a first predetermined message.

12. A radio selective call receiver according to claim 11, wherein said processor:

automatically switches the operation mode from said emergency mode into said normal mode when said identifier of said call is said common identifier and said message is a second predetermined message, and drives said display section and said notifying section to the switching of the operation mode.

13. A radio selective call receiver according to claim 11, further comprising a detector detecting a battery voltage, and wherein said processor controls said receiving unit to stop the receiving operation of in said normal mode when the detected battery voltage is lower than a predetermined voltage, and to continue the receiving operation in said emergency mode even if the detected battery voltage is lower than the predetermined voltage.

14. A radio selective call receiver according to claim 13, wherein said processor controls said display unit to display a symbol indicating that the detected battery voltage is lower than the predetermined voltage.

15. A radio selective call receiver according to claim 11, wherein said processor determines in said normal mode whether said normal mode message contains an error, and controls said display unit and said notifying section:

in said normal mode, to notify the arrival of said call and to display said normal mode message, when it is determined that said normal mode message does not contain any error;

in said normal mode, to notify the arrival of said call and to display said normal mode message, when it is determined that said normal mode message contains any error, and when an error message display permission is set in said normal mode message; and in said normal mode, to stop notification of the arrival of said call and to display of said normal mode message, when it is determined that said normal mode message contains any error, and when an error message display permission is not set in said normal mode message.

16. A radio selective call receiver according to claim 15, wherein said processor controls said display unit and said notifying section:

in said emergency mode, to notify arrival of said call and to display said individual emergency message, when said identifier of said call is same as said self identifier, regardless of whether said individual emergency message contains the error, and when said identifier of said call is same as said common identifier, regardless of whether said common emergency message contains the error.

17. A radio selective call receiver according to claim 11, wherein said processor:

selectively sets a protection indicator to each of the received normal mode messages in accordance with an instruction by a user, holds the normal mode messages with said protection indicator in a higher priority than the normal mode messages with no protection indicator, and holds the individual or common emergency messages in a higher priority than the normal mode messages with said protection indicator.

18. A radio selective call receiver according to claim 17, wherein said processor:

holds the newest message in a higher priority than the oldest message in each of the individual or common emergency messages, the normal mode messages with said protection indicator, and the normal mode messages with no protection indicator.

19. A radio selective call receiver according to claim 11, wherein said processor determines whether a confirmation switch is operated after said emergency mode is set and controls said notifying section:

to notify arrival of said call in said emergency mode for a first predetermined time period, and to notify arrival of said call in said emergency mode for a second predetermined time period which is shorter than said first predetermined time period, when it is determined that said confirmation switch is operated after said emergency mode is set.

20. A radio selective call receiver according to claim 11, wherein said processor controls said notifying section to notify said switching of the operation mode into said emergency mode in a sound volume larger than that set to notify the arrival of said call in said normal mode.

* * * * *